United States Patent [19]
Kahkoska

[11] Patent Number: 6,064,372
[45] Date of Patent: May 16, 2000

[54] TOUCHSCREEN DISPLAY SYSTEM FOR A TEST INSTRUMENT

[75] Inventor: James Anthony Kahkoska, Colo Sprgs, Colo.

[73] Assignee: Fluke Corporation, Everett, Wash.

[21] Appl. No.: 08/758,036

[22] Filed: Nov. 27, 1996

[51] Int. Cl.[7] ............................. G09G 5/00; G06F 13/00
[52] U.S. Cl. ........................... 345/173; 709/224; 379/29
[58] Field of Search ................................. 345/156, 157, 345/173, 179, 168, 352, 340, 134, 170; 399/81; 425/144; 395/183.14; 341/22, 23, 34; 380/24, 29; 705/43; 902/24; 702/68; 709/224; 379/29

[56] References Cited

U.S. PATENT DOCUMENTS

| | | | |
|---|---|---|---|
| 4,885,574 | 12/1989 | Negishi et al. | 345/174 |
| 5,056,059 | 10/1991 | Tivig et al. | 345/340 |
| 5,220,501 | 6/1993 | Lawlor et al. | 380/24 |
| 5,808,920 | 9/1998 | Zwan et al. | 395/183.14 |

*Primary Examiner*—Jeffery Brier
*Attorney, Agent, or Firm*—George T. Noe

[57] ABSTRACT

A graphical user interface implemented with touchscreen technology with associated indicators for a test instrument is provided. A set of indicators is mounted around the periphery of the touchscreen display so that each indicator is associated with a set of labeled softkeys on the touchscreen. Each of the indicators is chosen to indicate a piece of basic information that is necessary to communicate to the user of the test instrument in an unambiguous manner using color, such as the presence or absence of a signal, the presence or absence of an error condition, or a status of the test instrument. Because each indicator is coupled to labeled softkeys in the touchscreen display, an action to press an associated softkey is directly linked to each indicator to allow detailed information to be viewed graphically on the touchscreen display.

19 Claims, 7 Drawing Sheets

TOUCHSCREEN DISPLAY SYSTEM FOR A TEST INSTRUMENT

BACKGROUND OF THE INVENTION

This invention relates generally to graphical user interfaces and in particular to a touchscreen display system used in conjunction with associated indicators for controlling a handheld, electronic test instrument.

Electronic test instruments such as oscilloscopes have traditionally used graphical display in conjunction with softkeys to obtain an improved user interface. In the typical user interface, softkeys are placed around the periphery of the graphical display, either in the form of a cathode ray tube (CRT) or, more recently, liquid crystal displays (LCDs). Softkey labels are drawn on the graphical display adjacent to the softkey, so that the function and action associated with the softkey may be readily defined and re-defined according to the particular state of the user interface.

Touchscreen technology has provided a more recent innovation in user interface technology by allowing the user to touch a designated area of the graphical interface to generate an output signal rather than pressing a softkey adjacent to the graphical interface. Graphical displays employing colors are now available to further enhance instrument usability. Touchscreen display technology has largely been driven by the market demands of the computer industry for the personal digital assistant (PDA) which is designed as a portable, hand-held computer. By combining the functions of user input and graphical display output, the touchscreen user interface can be implemented in a smaller physical space, with enhanced versatility and reduced cost.

Handheld, portable test instruments have been developed that successfully employ graphical user interfaces in combination with softkeys, including portable digital storage oscilloscopes (DSOs) and local area network (LAN) test instruments. Most portable test instruments have substantial constraints on size and battery power which dictates the use of LCD technology for graphical user interfaces.

Portable test instruments with LCD graphical displays are increasingly being used in service, installation, and maintenance applications which often involve cramped locations and poor lighting conditions, by technicians who may only need to see certain basic information about what is being measured. LCD display technology, while extensively used in touchscreen user interfaces, often requires power consuming backlight circuits in order generate light in order to be seen in low ambient light conditions. The information on LCD displays is visible only from limited viewing angles which makes the operation of the portable test instrument more difficult.

Indicator lights or indicators have been added to the front panels of some test instruments to augment graphical displays as the user interface. Indicators provide for the visual indication of basic information about selected parameters. A selected parameter may include the status of a link pulse in the case of a LAN. Basic information about selected parameters may include the presence or absence of a link pulse on a LAN being tested, the presence or absence of an error condition, or the detection of a collision. Indicators are often implemented using light emitting diodes (LEDs) which require relatively little power, are easy to see even in low ambient light, and allow for fast cognition of the basic information by the user of the test instrument.

Indicators in prior art instruments are typically located on the front panel adjacent to a permanent label and with no visual linkage to softkeys, thus limiting their ability to be used in multiple roles. Such indicators have not been visually associated with the operation of the graphical display and softkeys in prior art instrument designs. Without this visual association, an error indicator will show that further investigation is needed using detailed information but provides no visual prompt as to how to proceed in order to obtain the detailed information appropriate for that error indicator. Because the visual association between the indicator and user action is not readily apparent, the user is likely to be confused as to what action is required.

Therefore, it would be desirable to provide a graphical user interface for a test instrument employing a set of softkeys with a set of indicators that are directly linked to the softkeys to provide a visual prompt for further actions. It would be further desirable that the indicators display basic information about selected parameters in parallel fashion using a selected set of colors for fast visual interpretation by the user.

SUMMARY OF THE INVENTION

In accordance with the present invention, a graphical user interface with associated indicators for a test instrument is provided. The graphical user interface is implemented with touchscreen technology in which the functions of graphical display and user entry are combined. A set of indicators is mounted around the periphery of the touchscreen display so that each indicator is associated with a softkey on the touchscreen.

Each of the indicators is chosen to indicate basic information about a selected parameter that is necessary to communicate with the user of the test instrument in an unambiguous manner. An example of a selected parameter is the status of a link pulse in a LAN connected to the test instrument. Basic information about the link pulse could include the presence or absence of the link pulse and whether there is a problem detected on the link pulse that is present.

The present invention is applied in a LAN test instrument which is coupled to a LAN to receive and analyze data traffic which appear as discrete frames. Each frame is received and processed to obtain network information. The network information includes a number of parameters such as the network utilization and the number of collisions on the LAN that may be displayed graphically as detailed information on the touchscreen display.

It is known that the display of information using generated light according to a selected set of colors provides for much faster cognition and interpretation by a user than a display of the same information in graphical or numerical form. Indicators are used to take advantage of this fact by allowing for visual association of basic information with the colors and with softkeys, rapid interpretation of the basic information even as the indicator colors rapidly change, and the interpretation of a group of indicators in combination to quickly arrive at overall interpretations of the network information without navigating a menu.

The selected parameters are displayed as basic information using a set of indicators that operate in parallel for each of the selected parameters and that are associated with softkeys drawn on the touchscreen display. The set of indicators show simultaneous basic information about a set of selected parameters which may be viewed in combination by the user.

A selected parameter such as network utilization may be displayed on the indicator using the set of selected colors. The set of selected colors preferably consist of high-contrast primary colors that are easily distinguished from each other. For example, green may be chosen to show low utilization, yellow to show medium utilization, and red to show high utilization. The use of actively-generated light in a selected color by the indicator provides for an easily interpreted indication of the selected parameter that may be viewed in any lighting condition, over a wide viewing angle, and without having to view and interpret the touchscreen display.

Because each indicator is coupled to softkeys drawn on the touchscreen display, an action of the test instrument is directly linked to a visual prompt created according to the selected color of an indicator. Each indicator may be thus used to visually prompt an action using the associated softkey. For example, a utilization indicator that is indicating the color red corresponding to a high utilization rate of the LAN is an unusual condition that will likely prompt the user to seek further detailed information from the test instrument. The softkey associated with the utilization indicator labeled "UTIL" may then be pressed and detailed information about the selected parameter of utilization may then be obtained from the touchscreen display.

As applied in a test instrument for LANs, a set of selected parameters includes the presence of the link pulse, the relative utilization rate, the occurrence of collisions, and the occurrence of errors. Each of the selected parameters has an associated indicator and softkey having an appropriate label. Each indicator indicates basic information about a selected parameter and the softkey may be pressed to obtain detailed information responsive to the selected color of the indicator.

By providing the set of indicators for basic information of network parameters that operate independently and in parallel with each other, the test instrument provides a quick, unambiguous visual indication of the status of the LAN being measured in the form of basic information that can be interpreted visually in combination by the user. Detailed information may be readily obtained by pressing the labeled softkeys associated with each indicator which provides visual prompts. As the instrument status changes or the network information changes, the softkey labels may be readily changed, thereby changing the meaning of the associated indicators and the action of the softkeys. Furthermore, each of the softkey labels may be localized to the language of the test instrument user.

One object of the present invention is to provide a graphical user interface for a test instrument using softkeys and associated indicator for a test instrument.

Another object of the present invention is to provide a touchscreen user interface having softkeys with associated indicators for a test instrument.

An additional object of the present invention is to provide a touchscreen user interface associated with indicators for a test instrument to visually indicate basic information about selected parameters using a selected set of colors.

A further object of the present invention is to provide a touchscreen user interface for a LAN test instrument with indicators associated with softkeys to visually prompt an action by the user to obtain detailed information by pressing an appropriate softkey.

Other features, attainments, and advantages will become apparent to those skilled in the art upon a reading of the following description when taken in conjunction with the accompanying drawings.

DETAILED DESCRIPTION OF THE INVENTION

Figure 1:
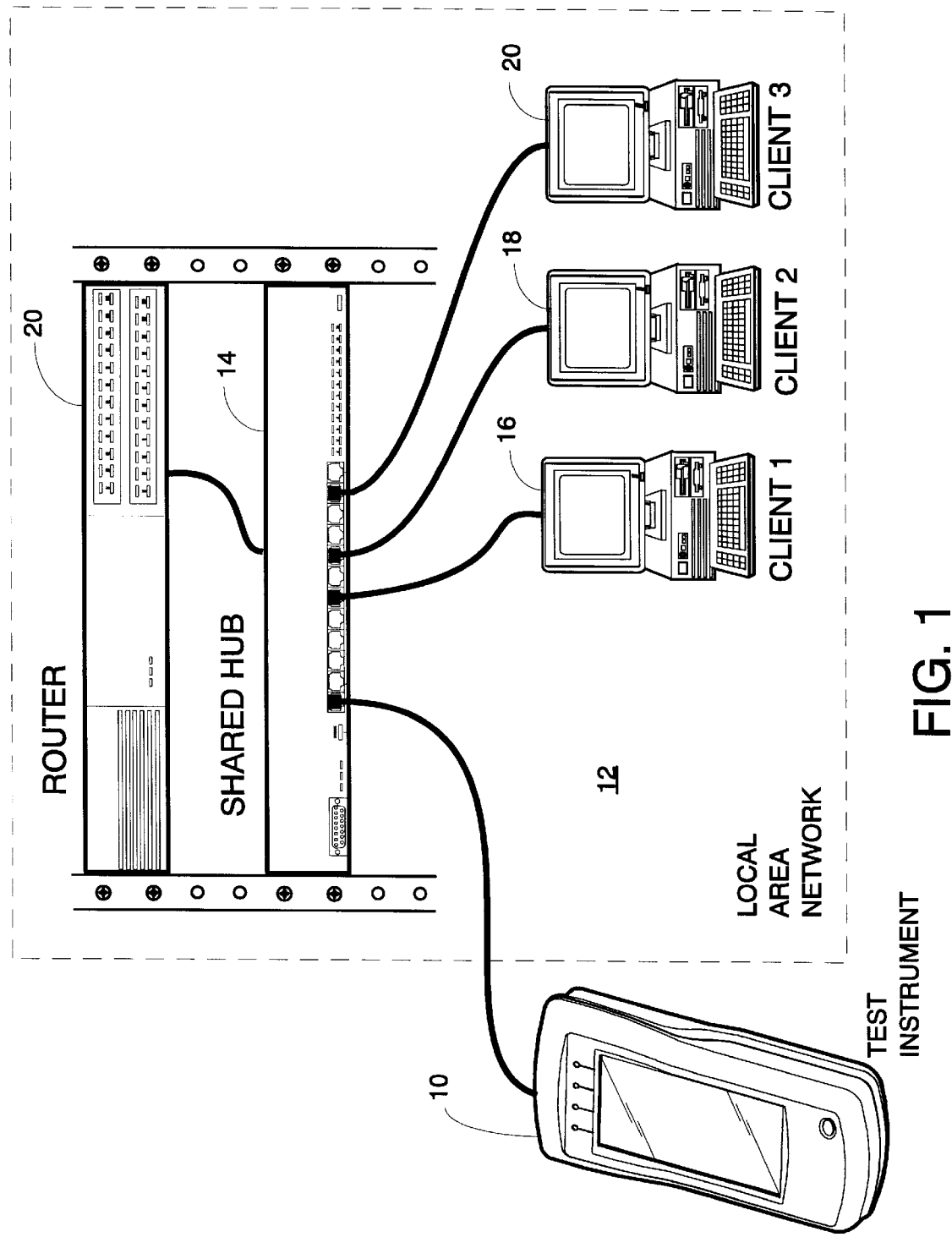
FIG. 1 is a simplified view (not to scale) of a test instrument with a touchscreen interface and associated indicators according to the present invention as applied to testing a local area network.

FIG. 1 is an illustration (not to scale) of a test instrument 10 with a touchscreen user interface and associated indicators according to the present invention as applied to testing a local area network (LAN) 12. The test instrument 10 is designed to be handheld, portable, and battery-operated, requiring that the user interface be compact, draw relatively little power and be capable of displaying relatively complex information, particularly in situations such as shown in FIG. 1. In testing the LAN 12, highly complex network information is acquired and displayed, both as basic information and as detailed information by the test instrument 10 which must then be interpreted by the user.

As shown, the LAN 12 is typical of what may be encountered in service, installation, and maintenance applications. A shared hub 14 is coupled to devices 16, 18, and 20, labeled CLIENT 1, 2, and 3 respectively, as well as a router 22 to form a typical local area network (LAN). The LAN 12 is typically implemented using the Ethernet protocol which provides for a base-band network in which the devices communicate with each other using data formatted as frames or packets. The test instrument 10 must be capable of displaying the network information in a manner that may be quickly understood by the user, often in cramped physical environments such as telecommunications closets where ambient light is poor.

Network information from the LAN 12 gathered by the test instrument 10 may include the presence of the link pulse from the shared hub 14, the level of utilization of the LAN 12, the presence of collisions in the traffic between the devices 16, 18, and 20, and the presence of errors on the LAN 12. While displaying network information as detailed information on the touchscreen display is necessary and desirable, combining a set of indicators that are associated with labeled softkeys on the touchscreen display greatly enhances the usability of the test instrument 10 by providing a quick, unambiguous visual display of the all the selected parameters in combination as basic information using emitted light according to a set of selected colors. In this way, the test instrument 10 provides a "go-no go" type of test result which may be all that is needed for a particular situation. At the same time, the set of indicators provides links to obtain detailed information about a selected parameter by providing a visual prompt to press the associated softkey.

Figure 2:
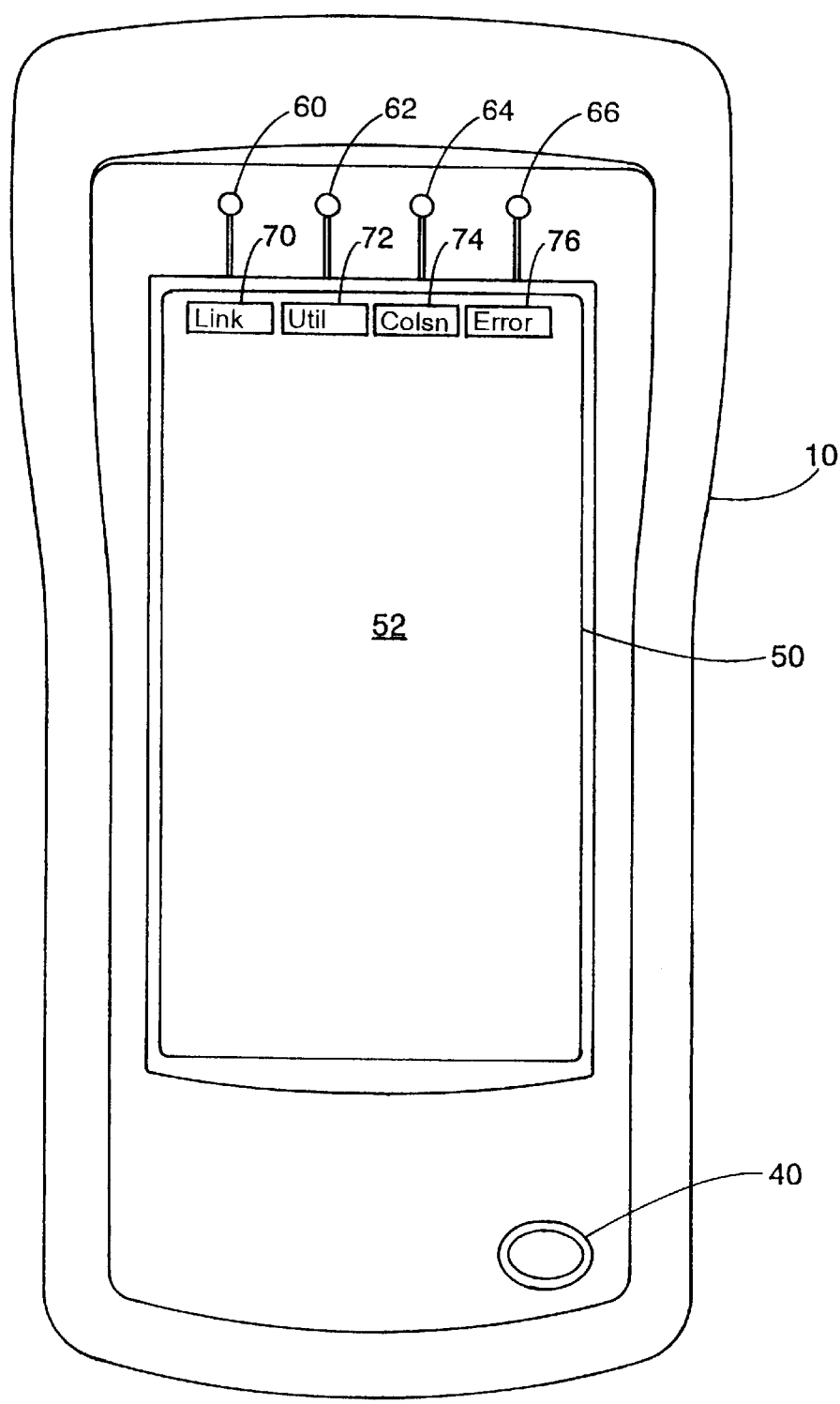
FIG. 2 is a top view of the test instrument of FIG. 1 showing the touchscreen interface for displaying detailed information and associated indicators for displaying basic information.

FIG. 2 is a top view of the test instrument 10 showing a touchscreen interface 50 mounted on an upper surface of the test instrument 10 for displaying detailed information. A row of softkeys 70, 72, 74, and 76 are drawn near the top edge of the touchscreen interface 50. Indicators 60, 62, 64 and 66 are mounted on the upper surface adjacent to the top edge of the touchscreen interface 50 and are positioned to physically correspond respectively with the softkeys 70, 72, 74, and 76. An area 52 of the touchscreen interface 50 is used for displaying detailed information graphically or numerically, typically in response to a press of one of the softkeys 70, 72, 74, and 76. An on-off switch 40 is mounted on the upper surface for turning the test instrument 10 on and off.

The indicators 60, 62, 64, and 66 may be arranged around the periphery of the touchscreen interface 50 and in greater or fewer numbers of indicators as needed. Each indicator is visually associated with a softkey on the touchscreen interface 50 typically by physical proximity. Softkeys 70, 72, 74, and 76 are shown drawn as rectangles on the touchscreen interface 50. The softkeys 70, 72, 74, and 76 contain the labels "Link", "Util", "Colsn", and "Error" respectively, with each label corresponding to a selected parameter of the network information gathered from the LAN 12 being tested by the test instrument 10. The softkeys 70, 72, 74, and 76 are associated with the indicators 60, 62, 64, and 66 respectively, by physical proximity and each association is enhanced by physical lines drawn on or etched into the top surface of the test instrument 10 between each of the softkeys 70, 72, 74, and 76 and the indicators 60, 62, 64, and 66 respectively.

The indicators 60, 62, 64, and 66 are preferably implemented using commercially available light emitting diodes (LEDs) which draw relatively little current while having the ability to generate light in accordance with to a selected set of colors. In the preferred embodiment, LEDs that selectively produce red, yellow, and green colors from the same LED component are used for enhanced versatility. Multiple LED components for one indicator may be readily combined to form one indicator. Other indicator colors may be readily substituted based on available technology and the requirements for the test instrument 10.

Figure 3:
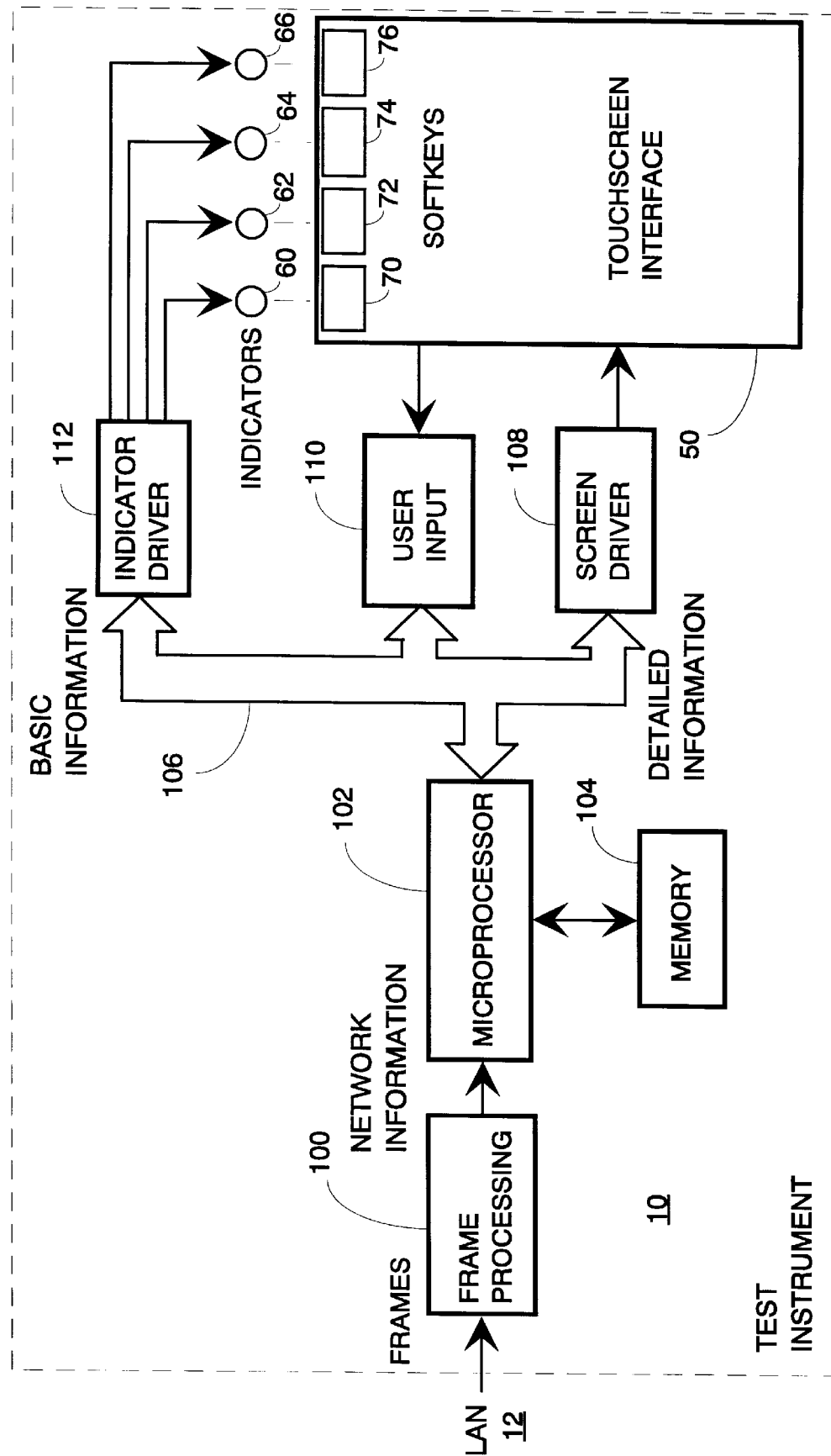
FIG. 3 is a simplified block diagram of the test instrument of FIG. 1 showing the operation of the touchscreen interface and associated indicators.

FIG. 3 is a simplified block diagram of the test instrument 10 showing the operation of the touchscreen interface 50 and the indicators 60 - 66. The test instrument 10 is coupled to the LAN 12 to receive network traffic in the form of frames. The frames are received by a frame processor 100 which generates network information in terms of selected parameters including collisions, presence of errors and the link pulse, amount of utilization, along with other network information such as the types of devices on the LAN 12 based on the frames received. The frame processor 100 may be implemented in hardware, software, or a combination thereof within the test instrument 10.

The network information generated by the frame processing operation 100 is received by a microprocessor 102 which executes an instrument control program contained in a memory 104. The network information is typically stored as a database in the memory 104 and then further analyzed by the microprocessor 102. The network information gathered may be displayed to the user as selected parameters in terms of basic information and also in terms of detailed information. The network information is communicated to the user of the test instrument 10 via the touchscreen interface 50 usually as detailed information that is shown in graphical or alphanumeric format in the area 52 (shown in FIG. 2) or as basic information that is shown on the indicators 60–66.

The microprocessor 102 places the detailed information on the touchscreen interface 50 via a data bus 106 to a screen driver 108 which handles the details of interface formatting and control.

User input in the form of presses by the user to the touchscreen interface 50 are received by the microprocessor 102 via the user input 110 which handles the details of interpreting the location of the keypress. Each location must be matched to one of the softkeys 70, 72, 74 and 76 which are drawn as rectangles in order to constitute a valid key press for that softkey. Each of the softkeys 70, 72, 74 and 76 has a label which defines its meaning and the meaning of the associated indicator in terms of the selected parameters. Each label may be readily redefined as desired according to the needs of the overall user interface design, either as new instrument configurations or to localize the user interface to relevant languages for world-wide markets.

The microprocessor 102 displays the basic information on the indicators 60–66 via an indicator driver 112. The indicator driver 112 may be implemented in hardware, software, or a combination thereof in order to provide electrical signals to activate each of the indicators 60–66 with the desired colors. The indicators 60–66 are preferably updated at a rate that is high enough so that the status of each indicator appears to resemble a "real time" viewing of the selected parameters as they occur on the LAN 12. The indicator driver 112 allows the indicators 60–66 to operate essentially in parallel and independently of one another so that multiple selected parameters may be visually interpreted in combination by the user.

Figure 4:
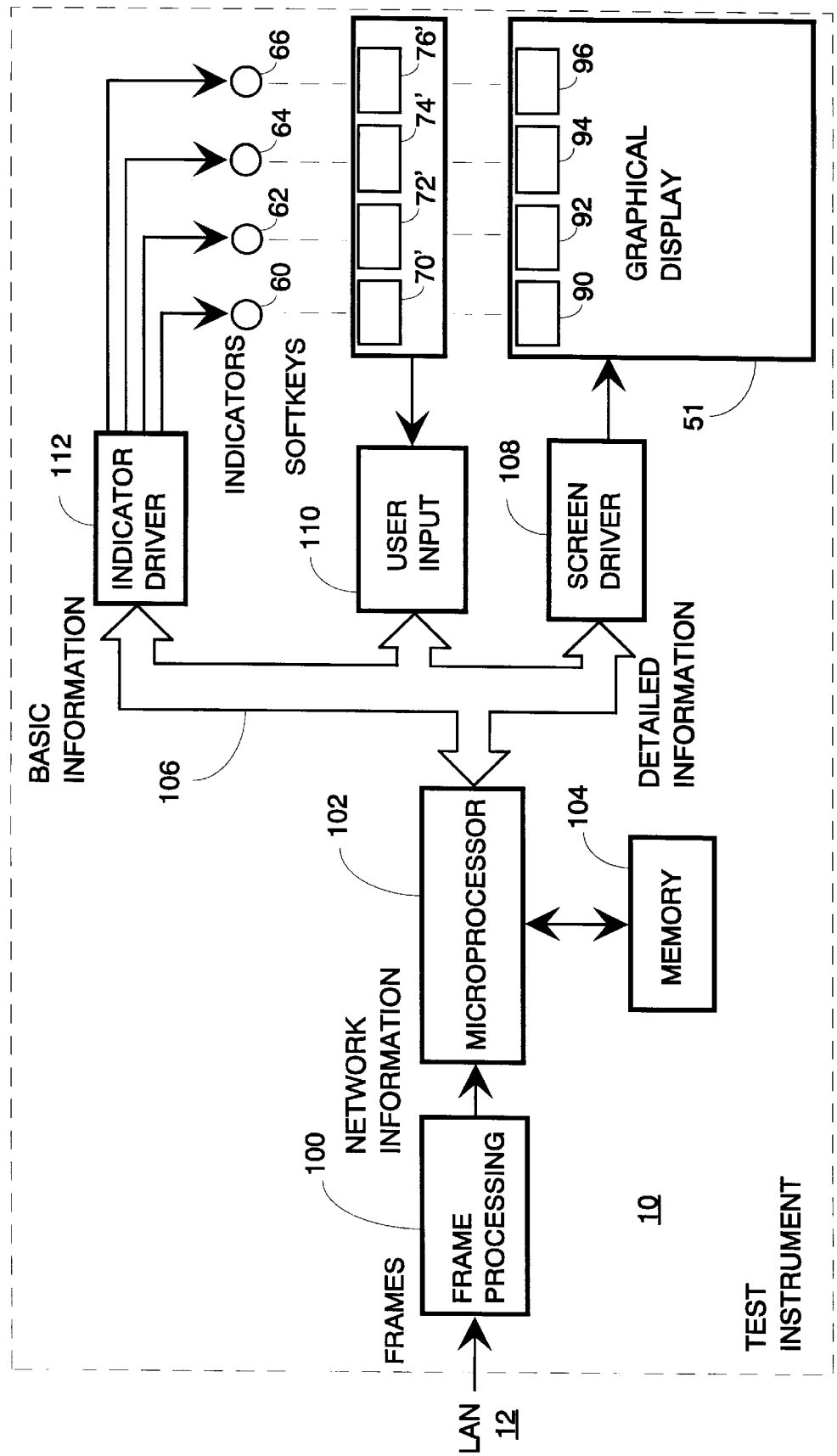
FIG. 4 is a simplified block diagram of an alternative embodiment of the test instrument of FIG. 1 showing the operation of a graphical user interface, separate softkeys, and associated indicators.

FIG. 4 shows an alternative embodiment of the present invention in which the touchscreen interface 50 is replaced by a graphical display 51. The softkeys 70, 72, 74, and 76 that were drawn on the touchscreen interface 50 are replaced with softkeys 70', 72', 74', and 76' that are physical switches constructed in the conventional manner. The indicators 60, 62, 64, and 66 are associated with the softkeys 70', 72', 74', and 76'. A set of softkey labels 90, 92, 94, and 96 drawn on the graphical display 51 are associated with the softkeys 70', 72', 74', and 76'. The user input 110 accepts the keypresses by each of the softkeys 70', 72', 74', and 76' and passes the keypresses on to the microprocessor 102.

Figure 5:
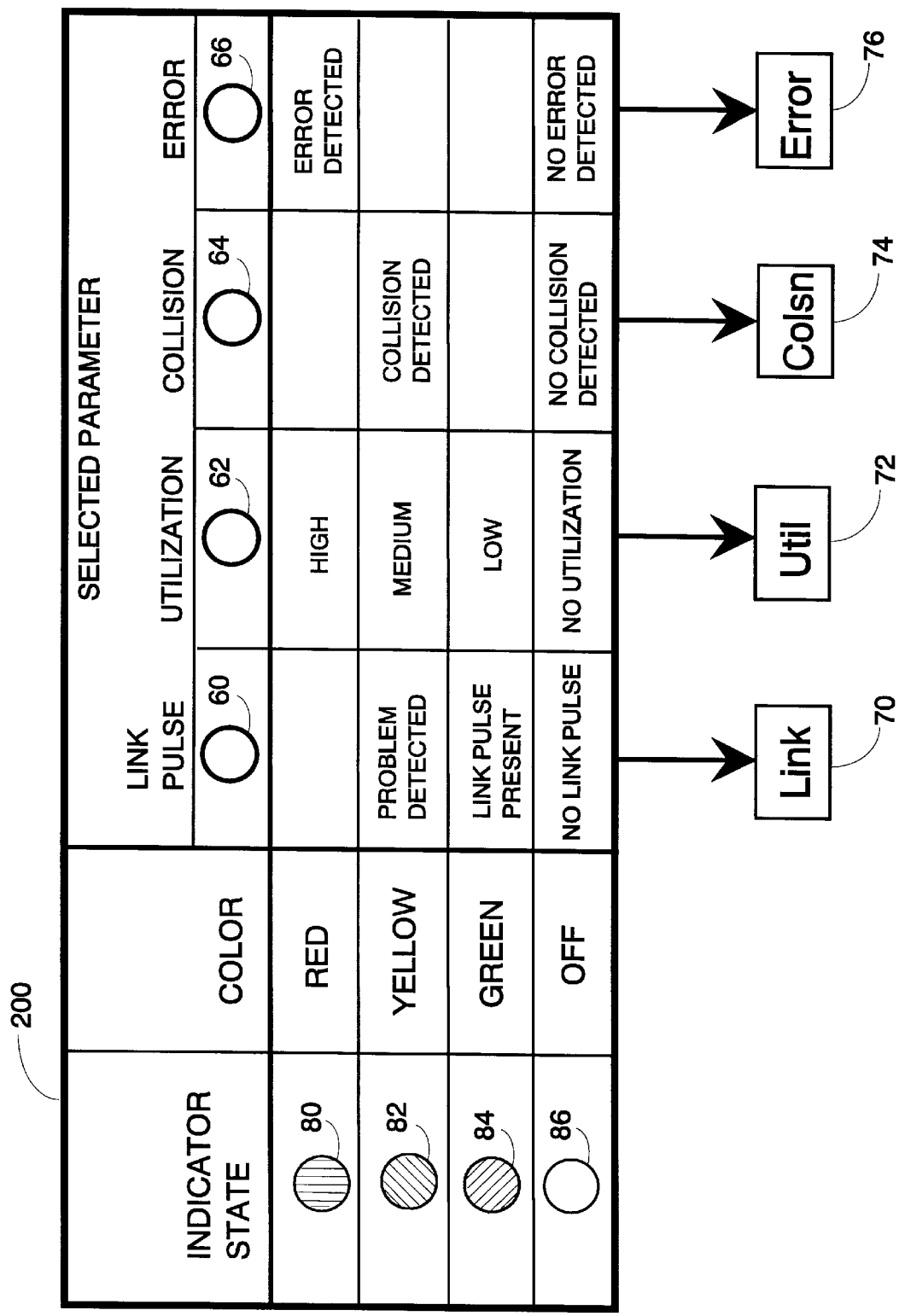
FIG. 5 is a table mapping the indicator color to basic information as a function of the selected parameters.

In FIG. 5, there is shown a table 200 mapping the set of selected colors for the indicators to the basic information as a function of the selected parameter. Each indicator may be off or on by displaying one of a selected set of colors. In the preferred embodiment, the colors include green, yellow, or red which are chosen based on the application requirements and the available technology. A set of four indicator states 80, 82, 84 and 86 are shown which are mapped to the indicator colors red, yellow, green, and off respectively. Off is typically a dark indicator rather than a positive emission of visible light. The basic information about the selected parameters communicated by the indicators 60, 62, 64, and 66 (shown in FIG. 2) includes link pulse, utilization, collision, and error which are placed as labels in abbreviated form in the softkeys 70, 72, 74, and 76.

The indicator 60 associated with the softkey 70 has three indicator states defined according to the selected set of colors, including off for no link pulse, green for link pulse detected, and yellow for problems detected on the link pulse. The color yellow would provide a visual prompt the user to press the softkey 70 to obtain detailed information on the nature of the problem detected on the link pulse.

The indicator 62 associated with the softkey 72 has four indicator states defined, including off for no utilization, red for high utilization, yellow for medium utilization, and green for low utilization. The definition of what constitutes low, medium, and high levels of utilization may be determined by a reasonable amount of experimentation or set according to commonly understood standards in the industry. The colors red and yellow tend to indicate a higher severity level which would visually prompt the user to press the softkey 72 to obtain detailed information on the nature of the utilization to determine if there is a problem. Because the level of utilization on a typical LAN varies in an unpredictable manner from one moment to the next, it is desirable that the state of the indicator 62 be updated rapidly to allow for better evaluation by the user of the test instrument 10.

The indicator 64 associated with the softkey 74 has two indicator states defined, including off for no collisions detected and yellow for collisions detected. The color yellow would provide a visual prompt to the user to press the softkey 74 to obtain detailed information on the level of collisions to determine if there is a problem. Because collisions are transitory events which the Ethernet protocol, among others, is designed to handle, it is desirable that the state of the indicator 64 be updated rapidly to allow for better evaluation by the user by observing the level of collisions occurring moment by moment.

The indicator 66 associated with the softkey 76 has two states defined, including off for no errors detected and red for errors detected. The color red would visually prompt the user to press the softkey 76 to obtained detailed information on the level of collisions to determine if there is a problem. The presence of errors on the network are typically transitory events such as short frames, "jabbers", and bad frame check sequences, all of which are corrected for under the network protocols by automatically re-sending the information. It is desirable that the state of the indicator 66 be updated rapidly to allow for better evaluation by the user by observing the level of errors occurring moment by moment.

Figure 6:
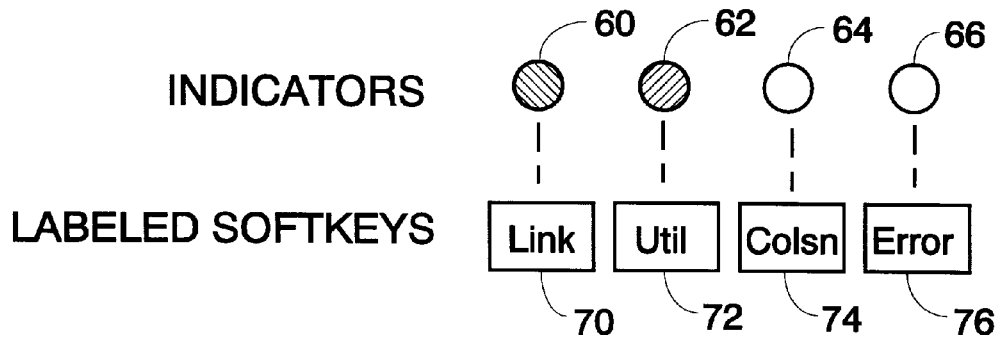
FIG. 6 is an example of indicator status which visually prompts an action by a user of the test instrument to press a labeled softkey.
Figure 7:
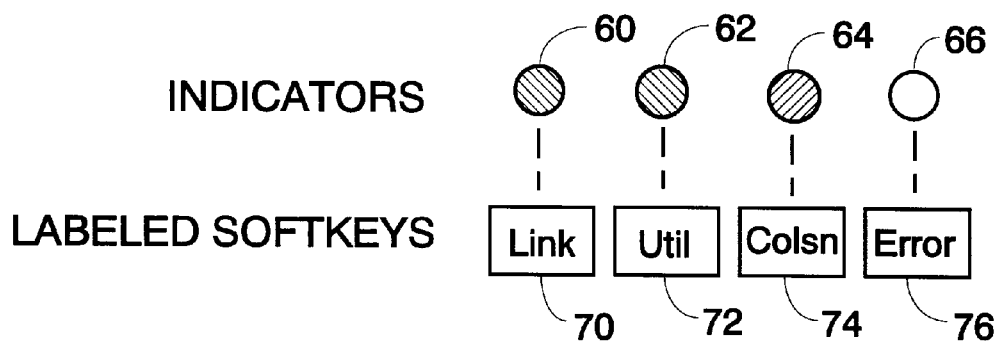
FIG. 7 is another example of indicator status which visually prompts an action by a user of the test instrument to press a labeled softkey.
Figure 8:
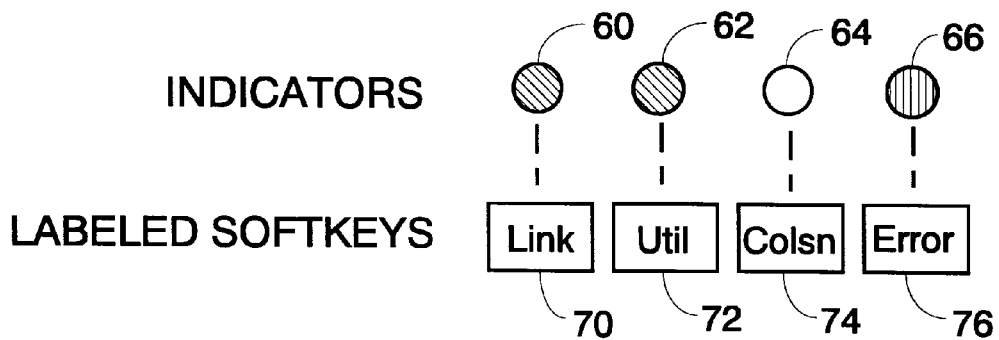
FIG. 8 is a further example of indicator status which visually prompts an action by a user of the test instrument to press a labeled softkey.

FIG. 6, FIG. 7, and FIG. 8 are examples of typical scenarios that may be encountered by the user in applying the test instrument 10 which has a touchscreen interface 50 with the indicators 60–66 according to the present invention. The indicators 60–66 operate independently in displaying the basic information according to a selected set of parameters. The display of all the indicator states from the indicators 60–66 operating to view all the basic information in combination is desirable because the user can view an overall "picture" of the selected parameters. Examples of typical situations that benefit from the parallel display of selected parameters is explained in further detail below.

In FIG. 6, there are shown the indicators 60–66 as associated with the softkeys 70–76 drawn on the touchscreen interface 50. The indicator 60 is shown having the color green according to the table 200 which is associated with the softkey 70 labeled "Link". The indicator 62 is shown having the color yellow according to the table 200 which is associated with the softkey 72 labeled "Util". The indicators 64 and 66 are off. This situation may occur when the test instrument 10 is coupled to the LAN 12 with a proper link pulse and a moderate amount of traffic. The absence of errors and collisions is indicated by the indicators 64 and 66 being off.

The choice of colors from the set of selected colors of the indicators to indicate these conditions is arbitrary. The colors green, yellow, and red were chosen in the preferred embodiment to aid rapid cognition by the user because of their analogy to the meaning of the colors in traffic signals where red means stop, yellow means caution, and green means go. The indicator 62 having a color of yellow or red associated with moderate or high levels of utilization will provide a visual prompt to the user to press the softkey "Util" to obtain more detailed information about the utilization on the network. The detailed information could include a listing of the devices that are the sending most of the traffic as well as a more precise figure of utilization such as "40%".

In FIG. 7, there are shown the indicators 60–66 as associated with the softkeys 70–76 drawn on the touchscreen interface 50 similar to FIG. 5. The indicator 60 is shown having the color green according to the table 200 which is associated with the softkey 70 labeled "Link". The indicator 62 is also shown having the color green according to the table 200 which is associated with the softkey 72 labeled "Util". The indicator 64 is shown having the color yellow according to the table 200 which is associated with the softkey 72 labeled "Colsn". The indicator 66 is off. This situation may occur when the test instrument 10 is coupled to the LAN 12 with a proper link pulse and a low amount of traffic but with collisions being detected. While collisions are expected to occur and the Ethernet protocol is designed to handle such situations well, the fact that collisions are occurring when network utilization is low may be a cause for some concern requiring further analysis by the user. The indicator 64 emitting yellow light will visually prompt the user to press the softkey "Colsn" to obtain more detailed information about the collisions occurring on the LAN to determine if there actually is a problem.

In FIG. 8, there is shown the set of indicators 60–66 as associated with the softkeys 70–76 which are drawn on the touchscreen interface 50 similar to FIG. 5. The indicator 60 is shown having the color green according to the table 200 which is associated with the softkey 70 labeled "Link". The indicator 62 is also shown having the color green according to the table 200 which is associated with the softkey 72 labeled "Util". The indicator 64 is off. The indicator 66 is shown having the color red according to the table 200 which is associated with the softkey 76 labeled "Error". This situation may occur when the test instrument 10 is coupled to the LAN 12 with a proper link pulse and a low amount of traffic but with an error condition on the LAN 12. Detected errors are definite problems requiring further analysis by the user. The indicator 66 emitting red light will visually prompt the user to press the softkey "Error" to obtain more detailed information about the nature of the error.

Figure 9:
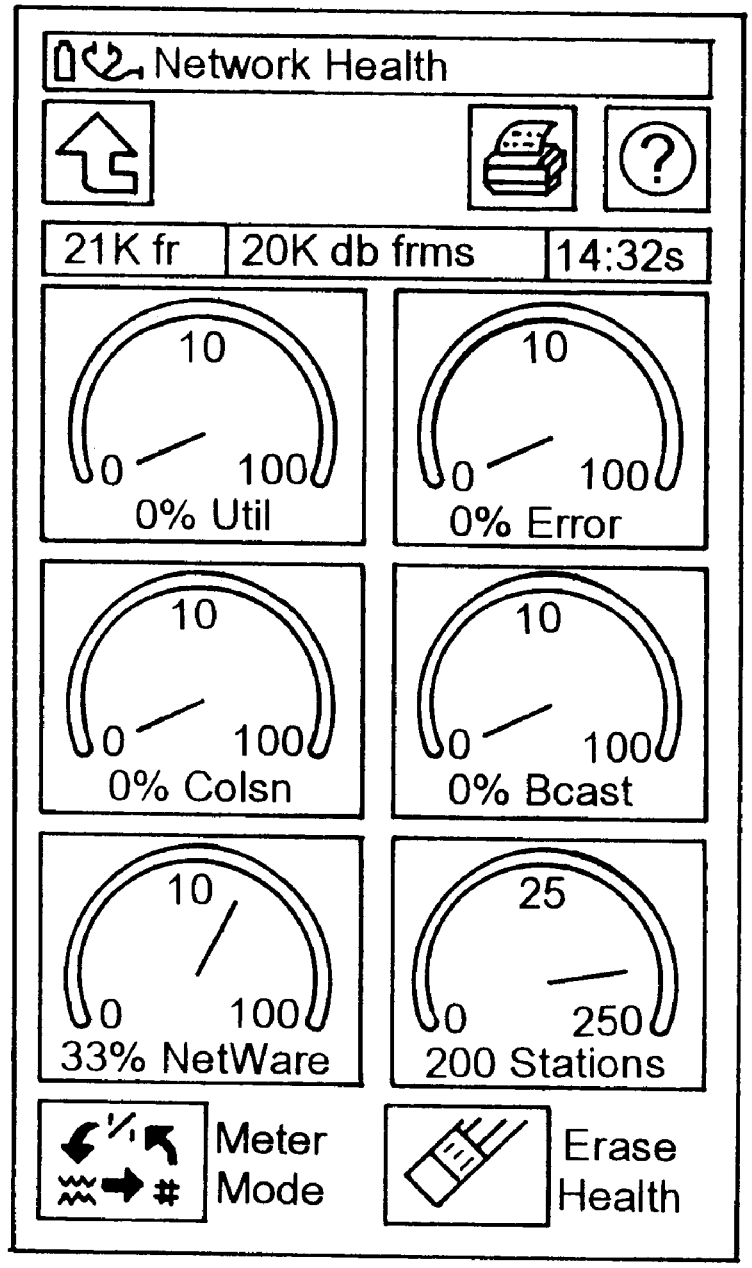
FIG. 9 is an example of detailed information about selected parameters that may be viewed on the touchscreen display of the test instrument after pressing a labeled softkey.

FIG. 9 is an example of a bit-mapped display image that could appear in the area 52 (shown in FIG. 2) that shows detailed information about a selected parameter. This detailed information could be accessed by pressing one of the softkeys 70, 72, 74, or 76 in response to a visual prompt provided by one of the indicators 60, 62, 64, or 66 that display the basic information about the selected parameters.

It will be obvious to those having ordinary skill in the art that many changes may be made in the details of the above described preferred embodiments of the invention without departing from the spirit of the invention in its broader aspects. For example, the indicators can be implemented in any type of lighting technology that allows for at least one color of light to be emitted and provides the user with basic information that is easily interpreted and is visually associated with the appropriate softkey on the touchscreen display. In addition to selectable colors, indicators may be chosen that have selectable flashing rates or selectable light intensities. The present invention may readily be adapted for conventional graphical displays which operate in conjunction with softkeys as long as the indicators are linked to the softkey so as to visually associate an action by the user. The present invention may be readily adapted to different types of test instruments that allow for basic information and detailed information to be displayed. Therefore, the scope of the present invention should be determined by the following claims.

What I claim as my invention is:

1. A graphical user interface for a test instrument, comprising:
    (a) a graphical display;
    (b) at least one softkey disposed on said graphical display and labeled according to a selected parameter wherein said graphical display displays detailed information about said selected parameter when said softkey is pressed; and
    (c) at least one indicator disposed adjacent to said graphical display and associated with said softkey wherein said indicator provides basic information about said selected parameter according to a set of selected colors and a visual prompt to press said softkey.

2. A graphical user interface for controlling a test instrument according to claim 1 wherein said graphical display further comprises a touchscreen interface.

3. A graphical user interface for controlling a test instrument according to claim 2 wherein said softkey is displayed on said touchscreen interface.

4. A graphical user interface for controlling a test instrument according to claim 1 wherein said indicator is mounted in physical proximity to said softkey.

5. A graphical user interface for controlling a test instrument according to claim 1 wherein said set of selected colors comprise colors that are readily distinguishable from each other.

6. A graphical user interface for controlling a test instrument according to claim 5 wherein said set of selected colors comprise red, yellow, and green.

7. A graphical user interface for controlling a test instrument according to claim 1 further comprising a plurality of softkeys and a plurality of indicators for displaying said basic information according to a plurality of selected parameters wherein each of said plurality of indicators is associated with one of said plurality of softkeys to independently display said basic information.

8. A graphical user interface for controlling a test instrument according to claim 7 wherein said plurality of selected parameters comprises link pulse, utilization, collision, and error.

9. A graphical user interface for controlling a test instrument, comprising:
    (a) a touchscreen display;
    (b) at least one softkey displayed on said touchscreen display wherein said softkey is labeled according to a selected parameter and said touchscreen display displays detailed information about said selected parameter when said softkey is pressed; and
    (c) at least one indicator disposed adjacent to said touch screen display and associated with said softkey wherein said indicator provides basic information about said selected parameter according to a set of selected colors and a visual prompt to press said softkey.

10. A graphical user interface for controlling a test instrument according to claim 9 wherein said indicator is mounted in physical proximity to said softkey.

11. A graphical user interface for controlling a test instrument according to claim 9 wherein said set of selected colors comprise colors that are readily distinguishable from each other.

12. A graphical user interface for controlling a test instrument according to claim 11 wherein said selected colors comprise red, yellow, and green.

13. A graphical user interface for controlling a test instrument according to claim 9 further comprising a plurality of softkeys and a plurality of indicators for displaying said basic information according to a plurality of selected parameters wherein each of said plurality of indicators is associated with one of said plurality of softkeys to independently display said basic information.

14. A graphical user interface for controlling a test instrument according to claim 13 wherein said plurality of selected parameters comprises link pulse, utilization, collision, and error.

15. A graphical user interface for controlling a test instrument, comprising:
    (a) a touchscreen display;
    (b) a plurality of softkeys displayed on said touchscreen display wherein each of said softkeys is labeled according to a selected parameter and said touchscreen display displays detailed information about said selected parameter when one of said softkeys is pressed; and
    (c) a plurality of indicators disposed adjacent to said touch screen display and Associated with each of said softkeys wherein each of said indicators provides basic information about one of said selected parameters according to a set of selected colors and a visual prompt to press one of said softkeys.

16. A graphical user interface for controlling a test instrument according to claim 15 wherein said indicators are mounted around the periphery of said touchscreen interface in physical proximity to said softkeys.

17. A graphical user interface for controlling a test instrument according to claim 15 wherein said set of selected colors comprise colors that are readily distinguishable from each other.

18. A graphical user interface for controlling a test instrument according to claim 17 wherein said selected colors comprise red, yellow, and green.

19. A graphical user interface for controlling a test instrument according to claim 15 wherein each of said plurality of indicators independently displays said basic information about one of said plurality of selected parameters.

* * * * *